United States Patent [19]
Cox

[11] Patent Number: 5,700,377
[45] Date of Patent: Dec. 23, 1997

[54] PURIFICATION OF WATER

[76] Inventor: Peter Glen Cox, P.O. Box 497, Linkhills, 3652, South Africa

[21] Appl. No.: 668,966

[22] Filed: Jun. 18, 1996

[51] Int. Cl.$^6$ .................... C02F 1/50; C02F 1/72
[52] U.S. Cl. .................... 210/724; 210/754; 210/759; 210/764; 210/688; 210/912; 210/169; 252/175; 422/6; 422/28
[58] Field of Search .................... 210/749, 754, 210/759, 764, 688, 912, 169, 723, 724; 252/175, 180, 181; 422/28, 6

[56] References Cited

U.S. PATENT DOCUMENTS

| | | | |
|---|---|---|---|
| 4,846,979 | 7/1989 | Hamilton | 210/754 |
| 5,478,482 | 12/1995 | Jones et al. | 210/753 |
| 5,501,802 | 3/1996 | Thorp et al. | 210/758 |
| 5,514,287 | 5/1996 | Jones et al. | 210/753 |

*Primary Examiner*—Neil McCarthy
*Attorney, Agent, or Firm*—Wood, Herron & Evans, L.L.P.

[57] ABSTRACT

A chemical composition for use in purifying water used in swimming pools having surfaces that are comprised of materials that do not react with or dissolve in water, comprising for 2.5 kg of the chemical composition, 1.25 kg of potassiumpersulphate, 300 g of sodium bisulfate, 250 g of ammonium chloride, 100 g of aluminum sulfate, 250 g of sodium bicarbonate, 250 g of calcium chloride and 100 g of ethylendiamine tetra acetic acid (abbreviated EDTA). The potassiumpersulfate and the ammonium chloride are effective in disinfecting water to be purified and in eradicating algae and bacteria therein. The sodium bisulfate, sodium bicarbonate and the calcium chloride are effective in balancing the pH of water to be purified to a pH value within an optimum range between 7.2 and 7.6. The aluminum sulfate serves as a flocculation aid and the copper sulfate is effective in the eradication of black algae. The EDTA is effective to complexing heavy metals in the water.

18 Claims, No Drawings

PURIFICATION OF WATER

BACKGROUND OF THE INVENTION

This invention relates to the purification of water. It relates particularly to a chemical composition for use in the purification of water for use in swimming pools and the like, having surfaces comprised of materials that do not react with or dissolve in water, to a kit including the chemical composition and to a method of purifying water, that includes the use of the chemical composition.

The purification of water used in swimming pools and the like, with chlorine-releasing agents is known. The chlorination of swimming pool water has been found to be detrimental to the health of bathers. The harmful side effects of chlorine including irritation to the eyes and mucous membranes of bathers are well documented. Furthermore, chlorine is known to give off a bad smell. The effectiveness of chlorine in the purification of water is also reduced by exposure to ultra-violet light. Other known halide containing disinfectants also show similar disadvantages.

Furthermore, chlorine-releasing agents have been found to damage swimming pools having polyvinylchloride linings.

The inventor of the present invention has invented a non-chlorine based chemical composition for use in purifying water, particularly, swimming pool water. This chemical composition is described in South African Patent No. 95/4754 filed in the inventor's name on 8 Jun. 1995 and is also the subject of a corresponding United Kingdom Patent Application No. 9519263.9 filed in the inventor's name on 21 Sep. 1995 (the chemical composition is hereinafter referred to as chemical composition A). The chemical composition essentially comprises 50% (m/m) of an alkaline persulphate selected from a group comprising potassiumpersulphate, sodiumpersulphate and ammoniumpersulphate, 25% (m/m) of an acidic compound in the form of sodium bisulphate, 15% (m/m) ammonium chloride, 5% (m/m) aluminium sulphate, 2.5% (m/m) sodium carbonate and 2.5% (m/m) copper sulphate. The alkaline persulphate and the ammonium chloride are effective in disinfecting water to be purified and in eradicating algae and bacteria therein. The aluminium sulphate serves as a flocculation aid, with the sodium carbonate acting as a buffer against high acid levels in the water to be purified. Finally, the copper sulphate forming part of the primary mixture of the chemical composition, is effective in the eradication of black algae that can stain the surfaces of swimming pools, and the like.

The inventor has found that chemical composition A provides a non-toxic alternative to chlorine-releasing agents for use in the purification of water in swimming pools having surfaces comprised of materials including alkaline minerals that are leached therefrom into the water, thereby raising the pH level of the water. This is particularly the case in, for example, marble plaster pools where natural balancing of the water occurs due to the leaching out of calcium from the marble plaster surface.

It has been found by the inventor of the present invention that in the case of swimming pools and the like, having surfaces comprised of substances that do not react with or dissolve in water, for example, glass fibre-reinforced pools, vinyl pools, painted or tiled pools, chemical composition A is not suitable. Such swimming pools and the like, are defined herein as non-porous swimming pools. Any reference hereinafter to a non-porous swimming pool must be interpreted to mean a swimming pool and the like, having surfaces comprising substances that do not react with or dissolve in water.

Because of the inherently lower alkaline levels in non-porous swimming pools in comparison to pools having surfaces comprised of alkaline minerals that can be leached out into the water, the acid levels in the water will be increased with the addition of chemical composition A to the water, with a resultant lowering of the pH level in the water below the recognised human comfort zone pH of 6.8 to 7.6. (The natural pH of a person's hair and skin is 7.3, and thus the preferred human comfort zone is 7.2 to 7.4).

It must be appreciated that potable water typically has a pH of 8.3 with a "total alkalinity" of 50 ppm and a calcium content of 100 ppm. The term "total alkalinity" is used to describe the total amount of dissolved alkaline substances in water, excluding calcium. Calcium is often referred to as the "anchor" in water as, although being alkaline, it does not react readily with an acid and thus tends to maintain its stability. "Dissolved solids" in suspension in swimming pool water, predominantly provided by the total alkalinity and calcium in the water, give the water its "blue" colour when sunlight reflects off the water. Thus, reductions in the amount of dissolved solids in water will result in the water having an increasingly green colour. It will be appreciated that it is desirable to provide a water purification composition that provides sufficient dissolved solids to give the water a blue colour.

In order to bring the pH level of potable water within the human comfort zone it is necessary to add acid to the water with the result that the amount of acid required to adjust the pH level of the water until it has a pH value in the human comfort zone will result in the total alkalinity of the water and to a lesser extent, the calcium content, of the water being reduced to unmanageable levels where the water will reach a permanently unbalanced state, if no significant amounts of alkaline compounds are also added to the water. Such permanently unbalanced water is often referred to as "dead water". From the above discussion it can be seen that it is essential in water used in swimming pools, that the correct balance of acidity/alkalinity and calcium in the water is maintained for the water to be "manageable". It has been found by the inventor that the correct balance of acidity/alkalinity and calcium in water could not be achieved in non-porous swimming pools by using chemical composition A.

It is necessary to add acid compounds to swimming pool water to adjust the pH level and also to keep heavy metal ions, in particular, iron and copper ions in suspension. The inventor has found that when acid levels drop in water to be purified, the metal ions in the water tend to form colloids with the alkaline persulphate compound giving the water a "greenish" colour. Furthermore, when said levels drop, the effectiveness of the alkaline persulphate in the composition as an oxidiser and disinfectant is severely reduced as hydrogen ions supplied by acid compounds in the water react with the alkaline persulphate to increase its effectiveness as an oxidiser and disinfectant. In order to maintain a manageable balance of acid compounds, alkaline compounds and calcium in the water in non-porous swimming pools, substantially less acid is required in such water than is the case with, for example, marble plaster pools, such that although the correct pH value can be achieved by the reduced acid required, there will be insufficient acid available to keep the metal ions in suspension and as a result the metal ions in the water tend to form colloids with the alkaline persulphate resulting in the problems referred to hereinabove.

A further problem experienced by the inventor with the use of chemical composition A in non-porous swimming pools is that because it is not possible to maintain the pH of the water within the human comfort zone, the copper sulphate in the composition reacts with the alkaline persulphate when the pH is out of balance, to form copper hydroxide which gives water a "greenish" appearance. Furthermore, as the formation of black algae is not a problem in non-porous pools, the copper sulphate serves no purpose in such pools.

SUMMARY OF THE INVENTION

It is an object of the above invention to provide a chemical composition that is non-toxic and that does not have the disadvantages associated with the use of chlorine-releasing agents in purifying water.

It is a further object of the present invention to provide a chemical composition that ameliorates the problems associated with the use of the present inventor's chemical composition A in the purification of water in non-porous swimming pools.

According to a first aspect of the invention there is provided a chemical composition for the purification of water for use in non-porous swimming pools, which comprises a primary mixture of a peroxide compound in the form of an alkaline persulphate, an acidic compound in the form of sodium bisulphate, an ammonium-based biocidal compound, a basic compound in the form of sodium bicarbonate, a calcium-releasing basic compound and ethylendiamine tetra acetic acid (abbreviated EDTA), the mixture containing 45 to 55% (m/m) alkaline persulphate, 8 to 16% (m/m) sodium bisulphate, 8 to 12% (m/m) ammonium-based biocidal compound, 8 to 12% (m/m) sodium bicarbonate, 8 to 12% (m/m) calcium-releasing basic compound, and 2 to 6% (m/m) EDTA, the alkaline persulphate and the biocidal compound being effective in disinfecting water to be purified and in eradicating algae and bacteria therein, with the sodium bisulphate, the sodium bicarbonate and the calcium-releasing basic compound being effective in balancing the pH of water to be purified to a pH value within an optimum range between 7.2 and 7.6, and the EDTA being effective to complex heavy metals in the water to be purified.

The alkaline persulphate may be selected from a group comprising potassiumpersulphate, sodiumpersulphate and ammoniumpersulphate.

The biocidal compound may be ammonium chloride.

The chemical composition may include an effective amount of aluminium sulphate to serve as a flocculation aid.

The calcium-releasing basic compound may be calcium chloride.

The chemical composition may comprise 50% (m/m) alkaline persulphate, 12% (m/m) sodium bisulphate, 10% (m/m) ammonium chloride, 4% (m/m) aluminium sulphate, 10% (m/m) sodium bicarbonate, 10% (m/m) calcium chloride, and 4% (m/m) EDTA.

According to a second aspect of the invention there is provided a kit for the purification of water, for use in non-porous swimming pools, which comprises a primary mixture of a peroxide compound in the form of an alkaline persulphate, an acidic compound in the form of sodium bisulphate, an ammonium-based biocidal compound, a basic compound in the form of sodium bicarbonate, a calcium-releasing basic compound, and ethylendiamine tetra acetic acid (abbreviated EDTA), the mixture containing 45 to 55% (m/m) alkaline persulphate, 8 to 16% (m/m) sodium bisulphate, 8 to 12% (m/m) ammonium-based biocidal compound, 8 to 12% (m/m) sodium bicarbonate, 8 to 12% (m/m) calcium-releasing basic compound, and 2 to 6% (m/m) EDTA, the alkaline persulphate and the biocidal compound being effective in disinfecting water to be purified and in eradicating algae and bacteria therein, with the sodium bisulphate, the sodium bicarbonate and the calcium-releasing basic compound being effective in balancing the pH of water to be purified to a pH value within an optimum range between 7.2 and 7.6, and the EDTA being effective to complex heavy metals in water to be purified.

The alkaline persulphate may be selected from a group comprising potassiumpersulphate, sodiumpersulphate and ammoniumpersulphate.

The biocidal compound may be ammonium chloride.

The kit may include an effective amount of aluminium sulphate, to serve as a flocculation aid.

The calcium-releasing basic compound may be calcium chloride.

The kit may comprise a container containing a chemical composition comprising 50% (m/m) alkaline persulphate, 12% (m/m) sodium bisulphate, 10% (m/m) ammonium chloride, 10% (m/m) sodium bicarbonate, 10% (m/m) calcium chloride, 4% (m/m) aluminium sulphate, and 4% (m/m) EDTA.

According to a third aspect of the invention, there is provided a method of controlling the purification of water use in non-porous swimming pools, which comprises the steps of:

monitoring the pH level of water to be purified; and in the event of the pH level not being in an optimum range between 7.2 and 7.6, adding a predetermined amount of a chemical composition to the water sufficient to adjust the pH level of the water to a pH value within said pH range, the chemical composition comprising a primary mixture of a peroxide compound in the form of an alkaline persulphate, an acidic compound in the form of sodium bisulphate, an ammonium-based biocidal compound, a basic compound in the form of sodium bicarbonate, calcium-releasing basic compound, and ethylendiamine tetra acetic acid (abbreviated EDTA), the mixture containing 45 to 55% (m/m) alkaline persulphate, 8 to 16% (m/m) sodium bisulphate, 8 to 12% (m/m) ammonium-based biocidal compound, 8 to 12% (m/m) sodium bicarbonate, 8 to 12% (m/m) calcium-releasing basic compound, and 2 to 6% (m/m) EDTA, the alkaline persulphate and the biocidal compound being effective in disinfecting water to be purified and in eradicating algae and bacteria therein, with the sodium bisulphate, the sodium bicarbonate and the calcium-releasing basic compound being effective to balance the pH of water to be purified to a pH value within an optimum range between 7.2 and 7.6, the EDTA being effective to complex heavy metals in the water to be purified.

The alkaline persulphate of the chemical composition may be selected from a group comprising potassiumpersulphate, sodiumpersulphate and ammoniumpersulphate.

The biocidal compound may be ammonium chloride.

The calcium-releasing compound may be calcium chloride.

The chemical composition may include an effective amount of aluminium sulphate to serve as a flocculation aid.

The chemical composition may comprise 50% (m/m) alkaline persulphate, 12% (m/m) sodium bisulphate, 10% (m/m) ammonium chloride, 10% (m/m) sodium bicarbonate, 10% (m/m) calcium chloride, 4% (m/m) aluminium sulphate and 4% (m/m) EDTA.

The invention in the manner in which it may be put into practice will now be described way of the following non-limiting example:

EXAMPLE

A chemical composition for use in the purification of water, in accordance with the invention, comprises a mixture of potassiumpersulphate, sodium bisulphate, ammonium chloride, aluminium sulphate, sodium bicarbonate, calcium chloride and EDTA.

It is envisaged by the inventor that the chemical composition will be provided in the form of a kit comprising a container containing 2.5 kg of the chemical composition, including 1.25 kg of potassiumpersulphate, 300 g of sodium bisulphate, 250 g of ammonium chloride, 100 g of aluminium sulphate, 250 g of sodium bicarbonate, 250 g of calcium chloride, and 100 g of EDTA. It has been found that in applications in which the purification of water in non-porous swimming pools is required, the chemical composition is most effective at a pH level in an optimum range between 7.2 and 7.6. Accordingly, in order to dose swimming pool water to be purified, the pH level of the water may merely be monitored and when it reaches a pH of 7.6, a required amount of the chemical composition may be added to the swimming pool water to effectively reduce the pH level to a pH of 7.2. It is envisaged by the Applicant that in the case of a swimming pool containing in the region of 10,000 gallons of water, 500 g of the chemical composition should be added to the swimming pool water once a week.

From the above discussion, it will be appreciated that the chemical composition in accordance with the invention, provides a complete treatment for the purification of water in non-porous swimming pools, thereby obviating the requirement for the addition of any other compounds to the water. As such, the chemical composition of the invention provides a complete treatment wherein the relative proportions of the various compounds constituting the chemical composition has been selected to provide an optimum balance between acid\alkaline levels and calcium content in water used in non-porous swimming pools, as well as providing for the effective disinfection of the water and eradication of algae and bacteria therein. As such, the potassium persulphate and the ammonium chloride are effective in disinfecting water to be purified and in eradicating algae and bacteria therein. The sodium bisulphate, sodium bicarbonate and calcium chloride are effective in balancing the pH of water to be purified to ensure that a pH value within an optimum range between 7.2 and 7.6 (within the human comfort zone) is maintained. As such, the sodium bicarbonate is particularly effective as a buffer against the sodium bisulphate and is also required to increase the total alkalinity of water to which the chemical composition is added. The calcium chloride is effective in releasing calcium into water to be purified. Accordingly, it is the sodium bisulphate, the sodium bicarbonate and the calcium chloride, in particular, that provide an optimum water balance in water that is dosed with the chemical composition. The EDTA is effective to complex heavy metals in the water to be purified and as such masks or protects the potassiumpersulphate from the damaging effect of metal ions in the water.

The inventor has found that the use of sodium bicarbonate which has a pH of 8.5 in the chemical composition of the invention is necessary because of the lower acid levels required for the purification of non-porous swimming pools. In chemical composition A, the sodium carbonate used has a pH of 11 and is thus a stronger buffer to the increased amount of acid required in the purification of swimming pools such as marble plaster pools, that leach alkaline minerals into the water.

An advantage of the chemical composition over the use of chlorine-releasing agents for use in purifying water in swimming pools having polyvinylchloride linings, is that due to potassium persulphate being a much less harsh oxidiser than chlorine, no damage to swimming pools having polyvinylchloride linings will be experienced.

I claim:

1. A chemical composition for the purification of water for use in non-porous swimming pools, which comprises a primary mixture of a peroxide compound in the form of an alkaline persulphate, an acidic compound in the form of sodium bisulphate, an ammonium-based biocidal compound, a basic compound in the form of sodium bicarbonate, a calcium-releasing basic compound and ethylendiamine tetra acetic acid (abbreviated EDTA), the mixture containing 45 to 55% (m/m) alkaline persulphate, 8 to 16% (m/m) sodium bisulphate, 8 to 12% (m/m) ammonium-based biocidal compound, 8 to 12% (m/m) sodium bicarbonate, 8 to 12% (m/m) calcium-releasing basic compound, and 2 to 6% (m/m) EDTA, the alkaline persulphate and the biocidal compound being effective in disinfecting water to be purified and in eradicating algae and bacteria therein, with the sodium bisulphate, the sodium bicarbonate and the calcium-releasing basic compound being effective in balancing the pH of water to be purified to a pH value within an optimum range between 7.2 and 7.6, and the EDTA being effective to complex heavy metals in the water to be purified.

2. A chemical composition as claimed in claim 1, wherein the alkaline persulphate is selected from a group comprising potassiumpersulphate, sodiumpersulphate and ammoniumpersulphate.

3. A chemical composition as claimed in claim 1, wherein the biocidal compound is ammonium chloride.

4. A chemical composition as claimed in claim 1, wherein the calcium-releasing basic compound is calcium chloride.

5. A chemical composition as claimed in claim 1, which includes an effective amount of aluminium sulphate to serve as a flocculation aid.

6. A chemical composition as claimed in claim 1, that comprises 50% (m/m) alkaline persulphate, 12% (m/m) sodium bisulphate, 10% (m/m) ammonium chloride, 4% (m/m) aluminium sulphate, 10% (m/m) sodium bicarbonate, 10% (m/m) calcium chloride, and 4% (m/m) EDTA.

7. A kit for the purification of water, for use in non-porous swimming pools, which comprises a primary mixture of a peroxide compound in the form of an alkaline persulphate, an acidic compound in the form of sodium bisulphate, an ammonium-based biocidal compound, a basic compound in the form of sodium bicarbonate, a calcium-releasing basic compound, and ethylendiamine tetra acetic acid (abbreviated EDTA), the mixture containing 45 to 55% (m/m) alkaline persulphate, 8 to 16% (m/m) sodium bisulphate, 8 to 12% (m/m) ammonium-based biocidal compound, 8 to 12% (m/m) sodium bicarbonate, 8 to 12% (m/m) calcium-releasing basic compound, and 2 to 6% (m/m) EDTA, the alkaline persulphate and the biocidal compound being effective in disinfecting water to be purified and in eradicating algae and bacteria therein, with the sodium bisulphate, the sodium bicarbonate and the calcium-releasing basic compound being effective in balancing the pH of water to be purified to a pH value within an optimum range between 7.2 and 7.6, and the EDTA being effective to complex heavy metals in water to be purified.

8. A kit as claimed in claim 7, in which the alkaline persulphate is selected from a group comprising potassiumpersulphate, sodiumpersulphate and ammoniumpersulphate.

9. A kit as claimed in claim 7, wherein the biocidal compound is ammonium chloride.

10. A kit as claimed in claim 7, wherein the calcium-releasing basic compound is calcium chloride.

11. A kit as claimed in claim 7, which includes an effective amount of aluminium sulphate, to serve as a flocculation aid.

12. A kit as claimed in claim 7, which comprises a container containing a chemical composition comprising 50% (m/m) alkaline persulphate, 12%. (m/m) sodium bisulphate, 10% (m/m) ammonium chloride, 10% (m/m) sodium bicarbonate, 10% (m/m) calcium chloride, 4% (m/m) aluminium sulphate, and 4% (m/m) EDTA.

13. A method of controlling the purification of water used in non-porous swimming pools, which comprises the steps of:

monitoring the pH level of water to be purified; and in the event of the pH level not being in an optimum range between 7.2 and 7.6, adding a predetermined amount of a chemical composition to the water sufficient to adjust the pH level of the water to a pH value within said pH range, the chemical composition comprising a primary mixture of a peroxide compound in the form of an alkaline persulphate, an acidic compound in the form of sodium bisulphate, an ammonium-based biocidal compound, a basic compound in the form of sodium bicarbonate, calcium-releasing basic compound, and ethylendiamine tetra acetic acid (abbreviated EDTA), the mixture containing 45 to 55% (m/m) alkaline persulphate, 8 to 16% (m/m) sodium bisulphate, 8 to 12% (m/m) ammonium-based biocidal compound, 8 to 12% (m/m) sodium bicarbonate, 8 to 12.% (m/m) calcium-releasing basic compound, and 2 to 6% (m/m) EDTA, the alkaline persulphate and the biocidal compound being effective in disinfecting water to be purified and in eradicating algae and bacteria therein, with the sodium bisulphate, the sodium bicarbonate, and the calcium-releasing basic compound being effective to balance the pH of water to be purified to a pH value within an optimum range between 7.2 and 7.6, and the EDTA being effective to complex heavy metals in the water to be purified.

14. A method as claimed in claim 13, wherein the alkaline persulphate of the chemical composition is selected from a group comprising potassiumpersulphate, sodiumpersulphate and ammoniumpersulphate.

15. A method as claimed in claim 13, wherein the biocidal compound is ammonium chloride.

16. A method as claimed in claim 13, wherein the calcium-releasing basic compound is calcium chloride.

17. A method as claimed in claim 13, wherein the chemical composition includes an effective amount of aluminium sulphate to serve as a flocculation aid.

18. A method as claimed in claim 13, wherein the chemical composition comprises 50% (m/m) alkaline persulphate, 12% (m/m) sodium bisulphate, 10% (m/m) ammonium chloride, 10% (m/m) sodium bicarbonate, 10% (m/m) calcium chloride, 4% (m/m) aluminium sulphate and 4% (m/m) EDTA.

* * * * *